United States Patent Office 3,704,111
Patented Nov. 28, 1972

3,704,111
RIPENING OF SUGARCANE BY USE OF ALKYL DERIVATIVES OF 3-PHENOXY PYRIDAZINE
Louis G. Nickell, Honolulu, Hawaii, assignor to Hawaiian Sugar Planters Association, Honolulu, Hawaii
No Drawing. Filed Aug. 14, 1970, Ser. No. 63,927
Int. Cl. A01n 9/22
U.S. Cl. 71—92
6 Claims

ABSTRACT OF THE DISCLOSURE

Sucrose yield of sugarcane is increased by treating sugarcane a few weeks prior to harvest with 3-(alkyl phenoxy)pyridazine compounds.

BACKGROUND OF THE INVENTION

Considerable progress has been made in the last several years in increasing the sugar yield of sugarcane by improving the varieties being planted, enriching the soil with fertilizers and irrigating the soil in climates which do not naturally provide sufficient moisture for optimum plant growth. More recent efforts in improving sugar production have increasingly turned toward the use of chemicals in modifying and controlling the physiological processes of sugarcane, particularly in ripening prior to harvest. See U.S. Pats. 3,224,865; 3,245,775; 3,291,592; 3,482,959; 3,482,961 and 3,493,361.

With some compounds previously suggested for this purpose, there has been some concern about their resistance to breakdown in the plant and their persistence in the soil when the intended use of the sugar is nutritive as opposed to industrial (e.g., in fermentation processes). Consequently, extensive efforts continue to be made in searching for effective chemical agents that can be used to modify the ripening of sugarcane so as to increase the sucrose yield therefrom.

Generally speaking, chemicals selected for evaluation have been of types which have been previously found active in work with other plants as plant hormones, herbicides or inhibitors of growth of terminal buds, or active in killing the spindle of cane upon topical micro-application, etc. However, among the compounds heretofore found to be useful for such other special purposes, very few have been found effective in controlling the ripening of sugarcane in the desirable manner. No predictable relationship has been recognized to date between (a) the chemical structure of such compounds, (b) their phytotoxic effects, or (c) their physiological effects on the morphogenetic development of the plant, and their activity in having positive effects on ripening. In other words, the effectiveness of a compound in controlling the ripening of sugarcane and thereby increasing sugar yield remains essentially unpredictable, and the search for suitable agents continues to be fundamentally empirical.

The 3-(alkylphenoxy)pyridazine compounds are selective preemergence herbicides which have been suggested for use in the selective control of weeds in such crops as alfalfa, corn, peas, rice, sugarbeet and tomatoes. They occur as stable, non-corrosive needle-like crystals that have limited solubility in water. Although toxicological studies of such chemicals are not complete, the $LD_{50}$ (mg./kg.) for 3-(2-methylphenoxy) pyridazine on rats is 1500 (orally), and it has been rated as minimally irritating to skin and eyes when tested by the Draizie method in rabbits. 3-(2-methylphenoxy)pyridazine is available commercially as a 50% wettable powder ("NIA 20439"), the remainder being inert materials used for formulation.

OBJECTS

It is an object of this invention to provide a new agent for controlling the ripening of sugarcane. A more specific object is to increase the sucrose yield of sugarcane by chemically treating it during its final ripening stages prior to harvest without introducing substantial toxicological hazards, and preferably without causing any visible damage to the cane plant such as drying of the spindle or other leaf.

Still more specifically, it is an object to increase the sucrose yield of sugarcane by treating it prior to harvest with a chemical agent which is sufficiently stable to provide the desired effect over a period of several weeks and thus give adequate operational flexibility, but which has a relatively low degree of persistence and is susceptible to auto-decomposition or decomposition by soil bacteria. Compounds which increase the sucrose content of sugarcane only temporily over a period of two or three weeks after application and then result in a substantial decrease are generally not desirable for the intended purpose.

SUMMARY OF THE INVENTION

It has now been discovered that excellent results in increasing the sucrose yield of sugarcane can be obtained by treating the younger, growing parts of the cane stalk a few weeks before harvest with a lower alkylphenoxy pyridazine, the chemical structure of which is shown below:

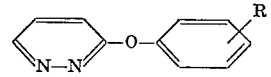

wherein R is an alkyl group of 1 to 6 carbon atoms, e.g. methyl, isopropyl, n-hexyl, etc. Exemplary compounds include 3-(4-isobutylphenoxy) pyridazine, 3-(3-n-hexyl-phenoxy) pyridazine, 3-(4-n-pentylphenoxy) pyridazine and 3-(2-methylphenoxy) pyridazine. The preferred species to date is 3-(2-methylphenoxy) pyridazine.

The preferred usage form in this invention is a mixture containing the compound in a aqueous solution or suspension utilizing one or a combination of non-ionic surface active agents.

In accordance with this invention the sugarcane crop is treated with a 3-(alkylphenoxy) pyridazine compound, or with a composition containing the compound, at any time from 2 to 10 weeks before harvest, the preferred time for treatment being between about 3 and 8 weeks prior to harvest.

Good results are obtained when the sugarcane crop is treated at a rate in the range of from about 1 to about 4 pounds of the pyridazine compound per acre of sugarcane, though higher rates of up to about 10 pounds or more per acre as well as rates lower than 1 pound per acre can be used. The optimum amount will vary somewhat depending on the specific treating composition applied, environmental conditions, time of year, age of cane and in some cases the specific variety of cane being treated, but can be readily determined for each particular case by preliminary testing.

The active agent is conveniently applied in the field in the form of an aqueous solution or suspension, e.g., a liquid composition which may be sprayed from a boom-spray or a solid dust composition where the active compound is diluted with an inert solid such as clay and which can be applied as a dust from an airplane. In preparing suitable liquid compositions, surface active agents of the type described for instance in U.S. Pat. 3,224,865, column 2, lines 61–66 or in U.S. Pat. 3,245,775, column 2, lines 57–64 are convenient to use. The preferred surfactants for use in liquid compositions of the present invention are those of the non-ionic type, e.g., alkyl phenoxy poly(ethylene-oxy) ethanols such as adducts of nonylphenol and ethylene oxide; trimethyl nonyl polyethylene glycol ethers; polyethylene oxide adducts of fatty and resin acids; and long chain alkyl mercaptan adducts with ethylene oxide.

With the type of boom-spray apparatus used in this work, it has been found convenient to apply the pyridazine compound to the sugarcane field in the form of aqueous solutions, suspensions or emulsions having a concentration of active agent such that the application at the rate of from 7 to 20 gallons of liquid composition per acre will provide the required dosage of active chemical. However, the use of lower or higher gallonages may be preferred when a different dispensing mechanism is used.

The preferred carrier for the active pyridazine compound is water to which about 0.1 to 2% by weight of surface active agent has been added. However, instead of using water as the carrier, non-phytotoxic mineral oils either as such or in the form of water-in-oil or oil-in-water emulsions may be used similarly in accordance with practices which are common in the art of treating vegetation with beneficial growth control agents.

DESCRIPTION OF SPECIFIC EMBODIMENTS

Example I 0.5 g. of pure technical grade 3-(2-methylphenoxy) pyridazine (hereinafter referred to as "MPP") is dissolved in 4 ml. water that contains as a surfactant about 0.25% (w./w.) nonylphenol which was ethoxylated to contain about 10.5 mols of ethylene oxide per mol of nonylphenol ("Tergitol NPX"). 0.6 ml. of this dispersion is deposited or dropped by means of syringe with a fine needle on the spindle area at the top or last visible dewlap of each of 20 stalks of sugarcane aged 19.6 months. (A dewlap is the junction between the blade of the leaf and the sheath which clasps the stalk.) Ten of these stalks were harvested 4 weeks after such treatment and 10 more were harvested 5 weeks after such treatment.

The top 15 joints of the treated cane as well as those of similar untreated cane are removed, combined and analyzed in terms of juice purity and pol percent cane, following the so-called "press method" developed by T. Tanimoto, Hawaiian Planters Record, 57, 133 (1964). "Pol percent cane" is a polarimetric determination and equals the percentage of sucrose if the latter is the only substance in the solution which will rotate the plane of polarized light. In the event, determination of the pol percent cane is a standard and effective method for determining the sucrose content of sugarcane.

The results are given below:

| | Time from treatment to harvest | | | |
|---|---|---|---|---|
| | Four weeks | | Five weeks | |
| | Juice purity | Pol percent cane | Juice purity | Pol percent cane |
| Control (untreated) | 63.08 | 6.08 | 77.26 | 9.35 |
| MPP | 71.02 | 7.75 | 79.40 | 10.08 |

As is apparent, the application of MPP resulted in a very substantial improvement in both juice purity and pol percent cane.

Example II

The procedure of Example I was repeated on stalks 21.0 months of age in a different field. The following results were obtained:

| | Time from treatment to harvest | | | |
|---|---|---|---|---|
| | Four weeks | | Five weeks | |
| | Juice purity | Pol percent cane | Juice purity | Pol percent cane |
| Control (untreated) | 72.17 | 8.04 | 67.03 | 7.93 |
| MPP | 78.16 | 9.60 | 79.02 | 10.57 |

A very apparent improvement in sucrose yield and juice purity results.

Example III

Example I is repeated on stalk 19.3 months of age with the following results:

| | Five weeks after treatment | |
|---|---|---|
| | Juice purity | Pol percent cane |
| Control (untreated) | 77.69 | 9.40 |
| MPP | 83.33 | 11.43 |

Again the improvement in sucrose yield and juice purity is apparent. Furthermore, the results of Examples I, II and III indicate that compounds of the invention are highly effective for the intended purpose relatively independently of the degree of ripeness which the cane has naturally reached at the time of the chemical treatment.

The nature, scope, utility and effectiveness of the present invention have been described and specifically exemplified in the foregoing specification. However, it should be understood that these examples are not intended to be limiting and that the true scope of the invention to be protected is particularly pointed out in the appended claims.

What is claimed is:

1. A process for increasing the sugar yield of grown sugarcane which comprises:
   applying to the cane a compound corresponding to the formula:

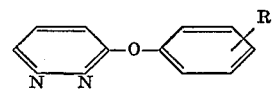

wherein R is alkyl of from 1 to 6 carbon atoms;
   said compound being applied to the cane at a time and in an amount effective to increase the sugar yield.

2. A process according to claim 1 wherein R is methyl.

3. A process according to claim 1 wherein the compound is 3-(2-methylphenoxy) pyridazine.

4. A process according to claim 1 wherein the compound is applied to the cane in admixture with water as a carrier.

5. A process according to claim 1 wherein the compound is applied to the cane in the form of an aqueous dispersion at the rate of about 5 to 10 gallons per acre at a time of from about 4 to 5 weeks prior to harvest.

6. A process according to claim 3 wherein the aqueous composition contains between 0.1 and 2% by weight of nonionic surface active agent.

References Cited

UNITED STATES PATENTS

| 3,427,146 | 2/1969 | Tamura et al. | 71—76 |
| 3,547,617 | 12/1970 | Tamura et al. | 71—92 |
| 3,493,361 | 2/1970 | Nickell et al. | 71—76 |
| 3,482,958 | 12/1969 | Nickell et al. | 71—92 |

OTHER REFERENCES

Delfel et al., "Evaluation of Phosphon and MH etc." (1966), CA 65, pp. 12792–93 (1966).

Nickell et al., "Effects of Chemicals or Ripening etc." (1965), HAW. Sugar Technol, 24th Ann. Conf., pp. 152–63 (1965).

Nickell et al., "Sugar Cane Ripening With Chemicals" (1967), HAW. Sugar Tech. Rpts. 26, pp. 104-9 (1967).

LEWIS GOTTS, Primary Examiner

G. HOLLRAH, Assistant Examiner

U.S. Cl. X.R.

71—76